Patented Dec. 14, 1937

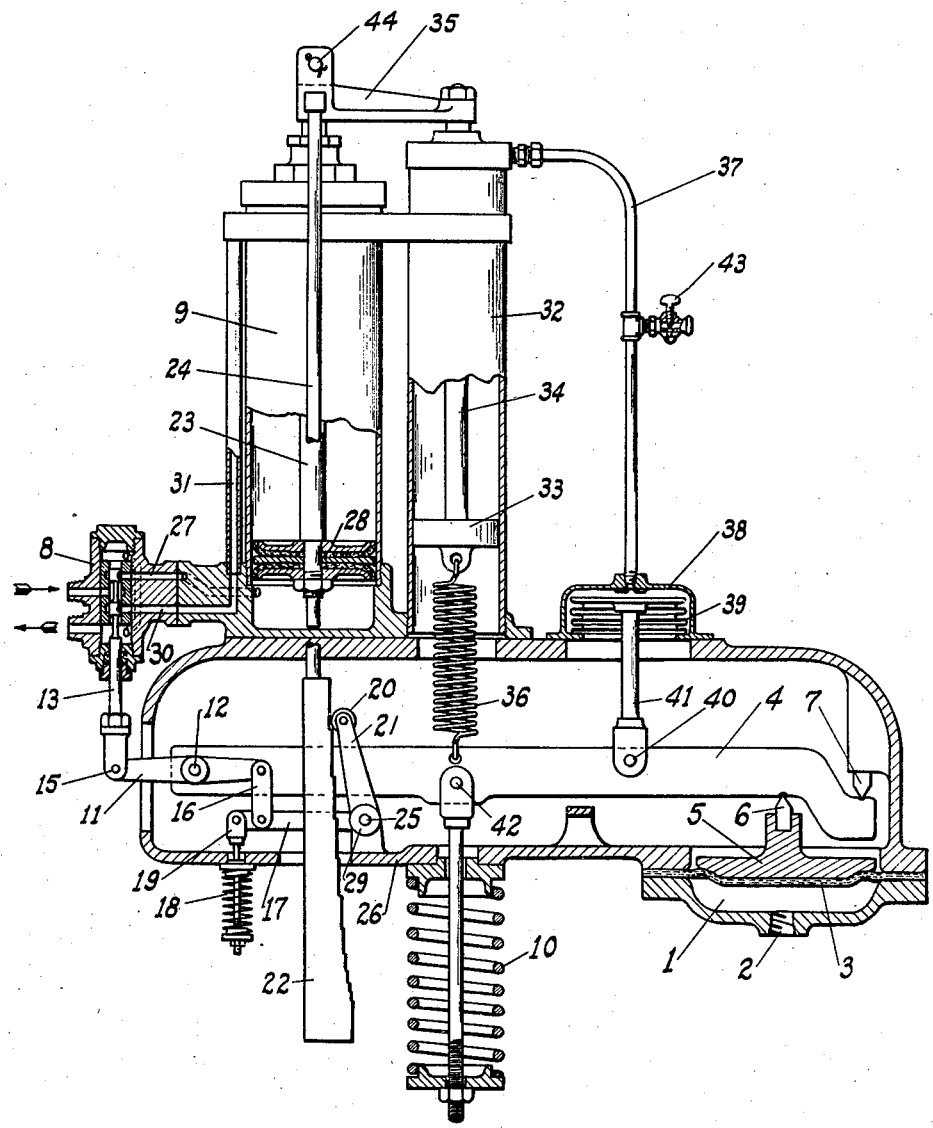

2,102,007

UNITED STATES PATENT OFFICE 2,102,007

REGULATOR

James L. Kimball, Danvers, Mass., assignor to Ruggles-Klingemann Mfg. Co., Salem, Mass.

Application January 8, 1936, Serial No. 58,094

10 Claims. (Cl. 121—41)

This invention relates to improvement in regulators for general use in the control of pressure, temperature, liquid level and other physical conditions. The invention is particularly adapted to be used with a power motor operated by an independent source of power for use in the operation of dampers, valves, and other control devices.

The principal object of the invention is to maintain that condition, over which it has control, constant regardless of variations in the volume demand or other variable factors such as time lag between the point of control and the point in the system from which the regulator is actuated. Another object is to accomplish this control step by step in definite steps of operation with a well defined time delay at the steps of operation of the power motor without the necessity of progressively changing the value of the setting of the regulator, which heretofore was a common defect in this type of regulator.

In order that my invention may be fully understood I will describe the same in connection with pressure control. Heretofore regulators of this class had a low pressure setting at high volume demand and a relatively high pressure setting at low volume demand. This was inherently so for the reason the regulator had no way of knowing that there was an increase in volume demand, except through a drop in the pressure.

My invention has for its main object the overcoming of this inherent defect in regulators of this class by devising means for neutralizing all gradient effect, without causing unstable operation.

Heretofore compensating effect in regulators of this class, having the combination of a pressure sensitive device, power motor and controlling element in which the pressure sensitive device controlled an independent source of power for operating the power motor, was to have the power motor so react on the pressure sensitive device as to change its pressure setting in the opposite direction to its initial movement.

This method of control though effective in preventing overtravel of the power motor resulted in a wide pressure operating range. Regulators of this class are used extensively in controlling balanced lever valves for reducing steam pressure and when so used the reduced pressure will be low on high volume demand and likewise high on low volume demand. This is obviously the wrong way around for at high volume demand a relatively higher reduced pressure is necessary to overcome increased pipe line pressure losses, and likewise at low volume demand where the pipe line pressure drop is at a minimum a relatively lower pressure setting of the regulator is desirable.

As already pointed out the principal means heretofore employed for preventing overtravel of this class of regulator was to automatically change the pressure setting of the regulator in the reverse direction to its initial movement, but when these regulators are used to reduce pressure the time or pressure lag is approximately 90 degs. out of step with the regulator and the ultimate result is that when the pressure finally becomes effective at the regulator we have two forces acting in the same direction which intensifies the tendency to overcorrect and operate with a continuous hunting action.

Assuming the pressure is slightly high and the regulator is actuated in a direction to reduce the pressure, at the same time the pressure setting of the regulator is automatically adjusted, through its follow up system of compensation, to increase pressure setting in order that the regulator will not overtravel and close off too much pressure. For the moment we have by this adjustment stabilized the regulator, but when the reduction of pressure finally becomes effective at the regulator the two forces, namely, the reduction in pressure and the increase in pressure setting are forces acting in the same direction which are factors in producing overcorrection and hunting action, due to time or pressure lag.

My invention is based on the principle that the change in pressure setting should be in the same direction as the initial movement, thereby acticipating time or pressure lag and at the same time overcoming the gradient of various parts of the regulator and permitting constant pressure to be maintained for all variations in volume demand.

My invention even goes further than this and makes possible a relatively higher reduced pressure on high volume demand, thus compensating for pipe line losses, and at the same time maintaining stable operation free from overcorrection and consequent hunting action.

To accomplish the objects of my invention I have chosen a regulator of the class disclosed in my Patent 1,564,682 of December 8, 1925, but preferably with a spring loaded scale beam as being suitable for carrying out the objects of my invention, and have associated with the power motor and the scale beam means for applying two resilient forces to the scale beam upon the motor commencing to act but in opposite directions and dissipating one of said forces only, as the power motor comes to rest, to terminate its retarding effect at the conclusion of each step of operation. The result of this operation is that a counterforce is applied to the scale beam during the adjustment period of neutralizing pressure setting gradient, and this counteraction applied to the beam is so timed by adjustment as to tend to prevent any further operation of the regulator until the pressure lag of the pressure system is taken up at which time the counteraction is dissipated leaving the regulator free to act and the pressure setting will be the same as at the beginning of the step of operation.

For each succeeding step of operation in either direction the above mode of operation is repeated so that the beginning and the ending of each step of operation is at the same pressure.

More specifically I attain these objects in a regulator arranged as shown in the accompanying drawing which shows a vertical elevation of my invention.

Referring to the drawing, (1) is a pressure chamber, (2) a pipe connection to the pressure system, (3) is a flexible diaphragm for transmitting variations in pressure in chamber (1) to scale beam (4) through pressure cap (5) and knife edge (6), beam (4) being fulcrumed on knife edge (7). The foregoing constitutes a pressure device adapted for controlling pilot valve (8) for operating fluid pressure motor (9). I use a spring (10) with connection on beam (4) at (42) for counteracting the pressure acting on diaphragm (3). A spring has little or no inertia effect as compared with dead weights and therefore is preferable for this purpose. The compensating arrangement for shifting the pilot valve from an effective to a neutral position at predetermined steps in the operation of the motor is substantially the same as shown in my Patent Number 1,597,203 of August 24, 1926, and consists of a floating lever (11) pivoted to scale beam (4) at point (12). One end of this floating lever is pivoted to pilot valve stem (13) at point (15). The opposite end is pivoted to a link (16) which connects this floating lever with the horizontal arm (17) of a bell crank (29). This horizontal arm (17) has a spring (18) and spring connection (19) adapted to hold roll (20), pivoted to the vertical arm (21) of this bell crank, in contact with step wedge (22). The bell crank (29) is pivoted at (25) on the regulator base housing (26). Step wedge (22) is operatively connected with plunger rod (23) by means of connecting rod (24). The operation of the regulator thus far explained is similar to that of my Patent Number 1,597,203 of August 24, 1926. On an increase in pressure acting on diaphragm (3) the scale beam (4) is raised against the resistance of spring (10) and thereby raises pilot valve stem (13) to admit fluid pressure from the inlet of pilot valve, as indicated by arrow, through port (27) to the underside of piston (28) which forces piston (28) upward, as roll (20) engages a higher step position on step wedge (22) the vertical arm (21) of bell crank (28) is forced to the right raising horizontal arm (17) and rocking floating lever (11) to return the pilot valve stem (13) to a neutral or shut off position to await a further increase or decrease in the pressure acting on the diaphragm (3). On a drop in pressure acting on diaphragm (3) the reverse takes place. The pilot valve stem (13) is lowered which admits fluid pressure to the upper side of piston (28) through port (30) and conduit (31) at the same time opening port (27) to exhaust and the motor plunger is moved downward and the roll (20) engages a lower step position on step wedge (22) and the pilot valve is again returned to neutral or a shut off position, and the motor plunger brought to rest.

In applicant's invention the step wedge (22) and parts 21—17—16—11 and 18 constitute a follow-up system of control, which means operating range, as beam (4) must travel a greater amount for the complete travel of piston (28) than would otherwise be required and consequently a greater gradient effect of spring (10), which all means a wide pressure operating range in chamber (1) for a complete travel of piston (28). Now this gradient effect produced by this follow up system of control is overcome by spring (36) so the operating range of the regulator becomes zero for all positions of travel between limits of operation of piston (28). In other words I have first built into this regulator gradient effect or operating range and then provided means of neutralizing this gradient effect. The purpose of the gradient effect in the first place is to effect step by step control, and the purpose of neutralizing this gradient effect is to reduce the operating range to zero. Now a regulator as above described would operate satisfactorily if there were no time lag between the time piston (28) operates and the time the result of this operation becomes effective at chamber (1). Therefore, to compensate for time lag I have applied means for resisting the operation of beam (4) during movement of piston (28) to prevent the beam from overtravelling until the time lag is taken up sometime after the plunger comes to rest, and then slowly dissipate or terminate the resisting effect.

I will now explain my invention as applied to a regulator of the class illustrated, altho it should be understood that my invention is applicable to regulators of the so called floating type as well as those of the step action type. The floating type of regulator can be described as one not having the abrupt steps on step wedge (22) but having a gradual compensating effect. Both types of regulators namely "step action" or "floating type" have compensating means generally referred to as "follow up system of control". My invention is not only applicable to the above classes of regulators but can be used to advantage in connection with regulators of the relay power motor type having no compensating or follow up system of control, and when so used or applied the regulator becomes self compensative as will hereafter be explained.

My invention comprises cylinder (32) having a piston (33) and piston rod (34). Piston rod (34) is connected with arm (35) and is operated by piston (28) of the power motor (9). To the lower side of piston (33) is connected a spring (36) and the opposite end of this spring is attached to the scale beam (4). A conduit (37) extends from the upper closed end of cylinder (32) to a pressure device (38) which has a pressure sensitive element (39) which is in this case a metal spun bellows, but can be a piston or a diaphragm or any similar device which is sensitive in responding to variations in pressure. This bellows is connected to scale beam (4) at point (40) by means of rod (41). The arrangement of spring (10) and spring (36) is such that the gradient of the spring (36) for the full travel of piston (28) and piston (33) is the same as the gradient of spring (10) for a much less travel of the beam (4) at the point of connection (42).

It will be seen that this arrangement neutralizes the gradient of the pressure counteracting spring (10) for all degrees of movement of the beam (4) required for a relative operation of piston (28). Due to the fact that for every step of operation of the power plunger the gradient of spring (10) for this step of operation is used up before spring (36) is automatically adjusted to neutralize gradient of spring (10), it follows that if a retarding effect was not applied to beam (4) during this adjustment period then the beam (4) would be operated by spring (36) resulting in an over-travel of piston (28) regardless of the cut off action at the step position. To eliminate this over-travel the piston (33) in its upward travel applies a retarding effect on beam (4) equal to the upward pull of the spring (36) by means of the operation of piston (33) compressing air in cylinder (32) and having this air pressure react on the flexible bellows (39) via conduit (37). After cut off action has taken place, the pilot valve having been returned to neutral and piston (28) come to rest, the air pressure acting on bellows (39) is dissipated through leak off cock (43). The regulator has now made a step of operation and the scale beam (4) adjusted to the same pressure as was on the diaphragm (3) before the step of operation took place, and this method follows for the entire steps of operation of the regulator.

On a drop in presusre on diaphragm (3) the scale beam (4) piston (28) and piston (33) all move downward and this downward movement of piston (33) reduces the tension of spring (36) to counteract for loss of spring gradient of spring (10). At the same time the downward movement of piston (33) produces a vacuum in cylinder (32) and on bellows (39) and consequently the atmospheric pressure acting on the underside of the bellows (39) is effective in applying the retarding effect to scale beam (4) during the adjustment period of spring (36) the same as in the upward movement.

One of the advantages of my invention is that the regulator can be adjusted to compensate for pressure time lag in the system by manipulating the adjustment of leak off cock (43). In this way we effect a time delay action which will allow the regulator to anticipate time lag in the system and to compensate for the same, the object being to hold the regulator beam (4) from over-traveling until the change in pressure in transit in the system caused by a change in the position of the regulator becomes effective in the pressure chamber (1).

While I prefer to use my invention in connection with step action types of regulators, as combining the most effective means for effecting stable operation without the necessity of operating over a wide pressure range, yet my invention taken alone without other stabilizing means renders the regulator, to a greater degree than ever heretofore attained, self compensating through the means of its time delay feature in compensating for time lag in the system.

It will be understood that the valve, damper, rheostat or other device to be controlled is operated from the power plunger with connection at (44). It should also be understood that while I have described my invention in connection with pressure control that it is equally applicable and efficient in the control of temperature, the only difference being that a thermostatic element is substituted in place of the pressure diaphragm in the operation of scale beam (4).

It is also effective in the regulation of volume control by using a pressure differential device for the operation of scale beam (4), the pressure differential being taken across a Venturi nozzle or orifice plate.

It may also be used to advantage in water level control by substituting float operation for pressure control. In the application of my invention to damper or valve control the upward movement of the piston (28) is for the closing movement of valve or damper and consequently the steps are made closer together at the bottom of step wedge (22). This is a valuable feature in compensating for variable flow characteristics of valves and dampers and is made possible through the fact that as piston (33) approaches the top of its stroke the damping action becomes more effective due to decreasing volume in the cylinder (32) and consequently increasing fineness in the steps of operation. The apparatus shown is only illustrative and is capable of various modifications and that only such limitations should be imposed as are indicated in the appended claims.

I claim as my invention:—

1. In a regulator for the control of a condition, comprising a motor, a control element adapted to control a source of power for operating said motor, a device responsive to variations in said condition, a beam connecting said device with said control element, means associated with said motor and said beam effective upon the motor commencing to act for applying two resilient forces to said beam but in opposite directions, and means to terminate one of the forces only upon the motor coming to rest.

2. In a regulator, a pressure sensitive device, a power motor for controlling the pressure on the pressure sensitive device, a pilot control element operated from the pressure sensitive device and adapted to control an independent source of power to operate the power motor, a spring adapted to counteract the pressure on the pressure sensitive device, a second spring connecting the power motor with the pressure sensitive device and adapted to neutralize the gradient of the first named spring for all degrees of operating range of the pressure sensitive device, and a second motor operated by the power motor adapted to react on the pressure sensitive device during the operation of the power motor and in the opposite direction to that of the gradient neutralizing spring to retard the operation of the pressure sensitive device during the operation of the power motor and to dissipate its retarding force after the power motor has come to rest.

3. In a regulator comprising a pressure device sensitive to variations in pressure acting on said pressure device, a motor for controlling the pressure on the pressure sensitive device, a control element operated from the pressure sensitive device and adapted to control a source of power to operate said motor, means associated with said motor and said pressure sensitive device for adjusting the pressure setting of said pressure sensitive device during the operation of said motor, an air motor operated in conjunction with said means for retarding the operation of the pressure sensitive device during the adjustment period by the motor and adapted to dissipate its retarding effect upon the motor coming to rest.

4. In a regulator for the control of a condition comprising means for controlling said condition, an operating member controlled in accordance with said condition for controlling the condition controlling means, means associated with said condition controlling means and said operating member effective upon the controlling means commencing to act for applying two resilient forces to said operating member but in opposite directions and means to terminate one of the forces only upon the controlling means coming to rest.

5. In a fluid system means for controlling the fluid in the system, an operating member controlled in accordance with the condition of the fluid in the system for controlling the fluid controlling means, means associated with said fluid controlling means and said operating member effective upon the controlling means commencing to act for applying two resilient forces to said operating member but in opposite directions, and means to terminate one of the forces only upon the controlling means coming to rest.

6. In a regulator for the control of a condition comprising a motor, a control element adapted to control a source of power for operating said motor, a device responsive to variations in said condition arranged to operate said control element, means associated with said motor and said responsive device effective on the motor commencing to act for applying two resilient forces to said responsive device but in opposite directions, and means to terminate one of the forces only upon the motor coming to rest.

7. In a regulator for the control of a condition comprising a motor, a control element adapted to control a source of power for operating said motor, a device responsive to variations in said condition, means connecting said device with said control element, means associated with said motor and said responsive device effective upon the motor commencing to act for applying two resilient forces to said sensitive device but in opposite directions, and means to terminate one of the forces only upon the motor coming to rest.

8. In a fluid pressure regulator comprising a power motor for controlling the pressure, a pressure sensitive device controlled in accordance with variations in said pressure and means controlled thereby for controlling the power motor in either of two directions, a spring connecting the power motor with the controlling means adapted to assist in the operation of the controlling means and a fluid pressure motor operated by the power motor adapted to counter-act the effect of said spring during the operation of the power motor and to dissipate its counter-acting effect upon the power motor coming to rest.

9. In a regulator comprising a pressure sensitive device, a motor for controlling the pressure on the pressure sensitive device, a control element operated from the pressure sensitive device and adapted to control a source of power to operate said motor, means associated with said motor and said pressure sensitive device for adjusting the pressure setting of the pressure sensitive device during the operation of the motor, and a dash pot operated by the motor and arranged to resist the operation of the pressure sensitive device during the adjustment period and to dissipate its resisting effect upon the motor coming to rest.

10. In a regulator comprising a pressure sensitive device, a power motor for controlling the pressure on the pressure sensitive device, a pilot control element operated from the pressure sensitive device and adapted to control a source of power to operate the power motor, a fluid motor operated by the power motor arranged to counter-act the pressure sensitive device during the operation of the power motor and adjustable means for timing the termination of the counteracting effect after the power motor has come to rest in time with the time required for the effect of the operation of the power motor to become effective at the pressure sensitive device.

JAMES L. KIMBALL.